R. J. R. Stone,
Mortising Machine.
No 10,603.    Patented Mar. 7, 1854.
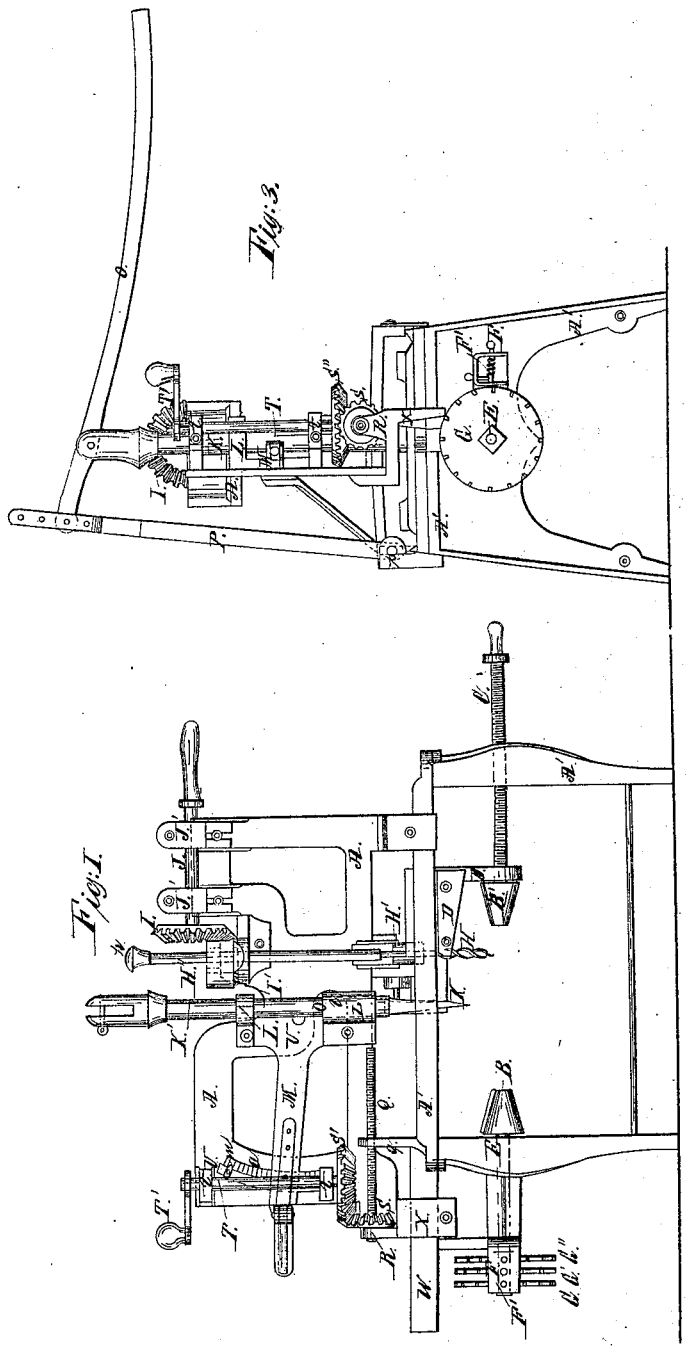
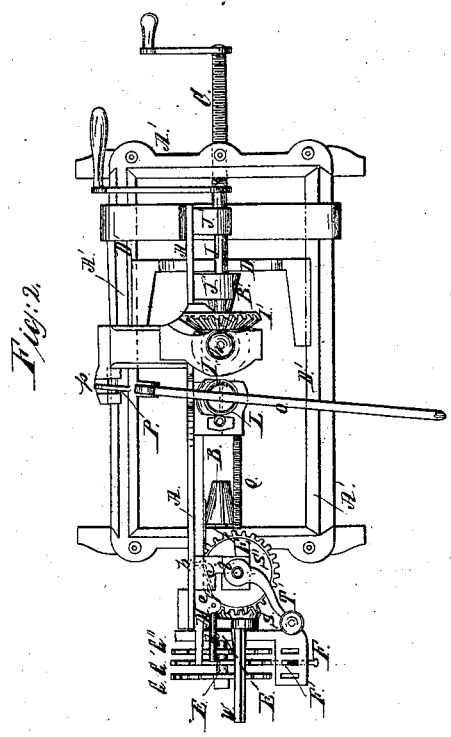

UNITED STATES PATENT OFFICE.

R. J. R. STONE, OF BERLIN, OHIO.

MACHINE FOR BORING AND MORTISING CARRIAGE-HUBS.

Specification of Letters Patent No. 10,603, dated March 7, 1854.

*To all whom it may concern:*

Be it known that I, R. J. R. STONE, of Berlin, in the county of Erie and State of Ohio, have invented certain new and useful Improvements in the Construction of Machines for Boring and Mortising Carriage-Hubs; and I do hereby declare that the following is a full and exact description thereof, reference being had to the accompanying drawings, and to the letters of reference marked thereon.

Figure 1, in the drawings, is an elevation, of my improved boring and mortising machine, Fig. 2, a plan view, and Fig. 3, an end view of the same, marked x x, in the Figs. 1 and 2.

Like letters refer to like parts in the different views.

The upper frame A A, slides longitudinally upon the ways of the lower frame A' A'. To the upper frame is attached the devices for boring and mortising, and to the lower frame the device for holding the hub when being bored and mortised, and also the index plates for registering the number of mortises in each hub, which are 12, 14, and 16. The hub to be bored and mortised, is first secured to the chucks B B', which are forced into the bore of the hub by the screw C which passes through a nut in the frame; at one end of the screw is attached a crank, at the other end, is secured the chuck B'. One end of the screw near the chuck is sustained by, and revolves in, a box in the yoke D, Figs. 1 and 2; this yoke slides upon the ways D', as may be required, by the action of the screw in adjusting the chuck to the hub. On the under side of the ways are jaws D'', which aid in keeping the yoke and hub in place. The chuck B is provided with ribs, for the purpose of more securely retaining the hub in place. The chuck B is secured to the shaft E, which shaft has one bearing in the frame close to the chuck, and the other at E', Fig. 2. To the shaft are secured the dial plates G G' G''. There may be more or less of these attached to the shaft, which may register, according to their number of notches any number of mortises that may be required. The dial plates here represented register 12, 14, and 16, mortises which is the usual number for ordinary purposes. The catch F, slides in the guide F', and by which it is retained in place; around the catch, is a spiral spring, for the purpose of forcing the catch F into the notches in the periphery of the dial plates. After one hole is bored, or mortised, as the case may be, the dial plate is turned so that the catch F will slip into the next notch, which will complete the boring or mortising of the hub in describing one circle of the dial plate. The hole in the hub may be all bored first, and the mortise beat out afterward.

After the hub is secured in place by the chucks, it is first bored by the auger H, Fig. 1, the shank of which passes through and is retained in a vertical direction, by the guides H' H''. The upper portion of the shank, which is square, passes through the center of the bevel wheel I, indicated by the dotted lines in Fig. 2; this wheel is cased over in the frame work but at the same time, sufficient is exposed to mesh in with the bevel wheel I', which is attached to the shaft J. This shaft has its bearings in the boxes J' J', and is secured to the top of the frame work. This mechanical arrangement, by turning the crank on the shaft J, turns the auger in the proper direction, which auger by the action of the screw, will bore the hub to the desired depth, and by a reverse motion of the auger, it will be relieved, and may be raised from the hole in the hub, by taking hold of the head *h*. Then by turning the dial plate one notch, the auger will again descend for boring, in the manner before described. After the hub has been bored, the beating of the mortise, is next in order.

K, represents the mortise chisel, and K' the shank to which it is attached; this shank slides in the guides L L, which are connected to the quadrant lever M. At the head of the shank is attached the lever O, which is connected to the rod P, Figs. 2 and 3. The lower end of this rod is secured to the top frame by a pin joint at *p*. In the upper end of the rod are series of holes for the purpose of adapting the chisel to the size of the hub, by applying the proper action to the lever O; the chisel moves up and down, and at the same time, the chisel with the frame A A, moves longitudinally with the mortise, by the action of the screw Q, Figs. 1 and 2. The standard *q* acting as the nut for it, one end of the screw revolves in the standard R, and as there is a shoulder on each side of the standard formed by a collar, the screw on the outside of the standard, the bevel gear S, on the inside, which gear is keyed to the screw close to the standard, this standard being a part of the frame A, is consequently moved in either direction, according to the rotating of the screw, as it cannot slip out of the standard R, there being a collar on each side of it in the position before described.

The gear S', meshes into the gear S. The gear S is keyed to the shaft T, which shaft is supported in the bearings $t\ t$, attached to the frame. On the upper end of the shaft, is a crank T', for the purpose of turning the screw as may be required by the gears S S'. One man only is required to operate this machine, as he works the lever with one hand, and the crank T', with the other. The chisel is prevented from turning when in operation, by the pin $l$, which is fitted to corresponding slots in the guide L. The shank of the chisel may be raised so as to withdraw the pin $l$ from the slot in the slide for the purpose of reversing the chisel, as may be required in beating the mortise in either direction. The quadrant lever M, is attached to the frame A, by the bolt U, upon which it moves, and by turning the lever M, the mortise may be beat out at any desirable angle, according to the dish of the wheel. The dish of the wheels will always be uniform, and indicated by the degrees marked on the frame at $a$.

For the purpose of keeping the lever in place, there are two studs, one on each side of it, in the slot V; one of which is seen at $m$, and is provided with screws and nuts, on the back side of the frame.

In Fig. 2 will be observed the pin $b$ and spring $c$, which aid in retaining the lever M in place as the pin is forced into that degree by the spring $c$; and which may be operated by the hand lever $d$, it being attached to the lever M by a pin joint at $e$, Figs. 1 and 2.

W is a way extending from the frame A' upon which it slides, and aiding in supporting the upper works by the guides X which are an extension of the frame work A.

What I claim as my improvement and desire to secure by Letters Patent, is—

The combination and arrangement of the chisel, and quadrant lever M, in the manner specified, for the purpose of beating out the mortise at any desired angle, as indicated by the index; I claim this in connection with the sliding frame A A, in the manner and for the purpose herein set forth.

R. J. R. STONE.

Witnesses:
J. S. DAVIS,
H. W. HAMMOND.